June 22, 1954 — J. R. O'CONNELL — 2,681,808
FEED CHUCK
Filed Nov. 28, 1950
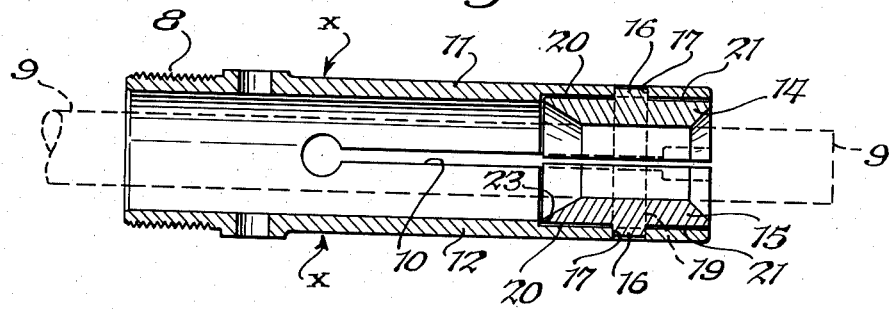
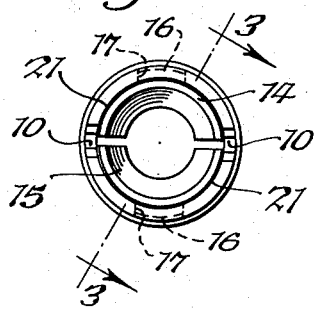
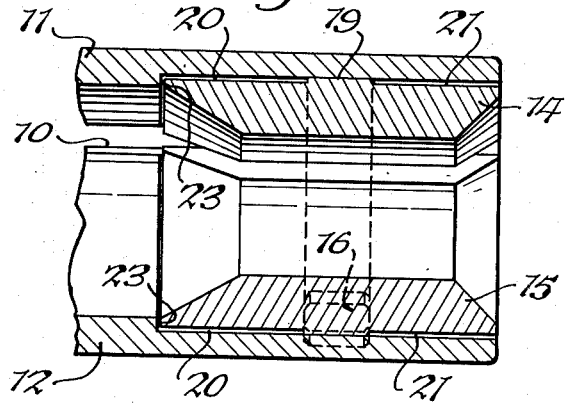
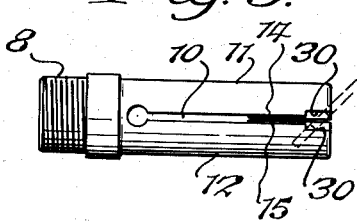
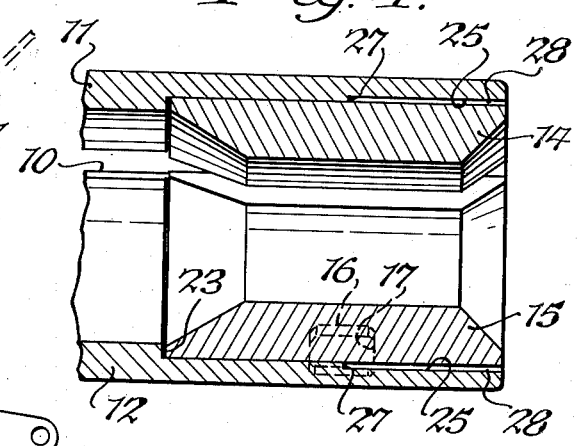
INVENTOR.
James R. O'Connell
BY Parker, Rodmow & Turner,
Attorneys.

Patented June 22, 1954

2,681,808

UNITED STATES PATENT OFFICE 2,681,808

FEED CHUCK

James R. O'Connell, Elmira, N. Y., assignor to Hardinge Brothers, Inc., Elmira, N. Y.

Application November 28, 1950, Serial No. 197,920

5 Claims. (Cl. 279—41)

This invention relates to improvements in feed chucks or feed fingers of the kind commonly used for advancing the work in automatic screw machines or the like, and particularly to improvements in the feed chucks shown in my Patents Nos. 1,502,116 of July 22, 1924, and No. 2,187,170, January 16, 1940.

In feed chucks of this type as heretofore generally constructed, the outer surfaces of the pads fitted securely against the inner surfaces of the outer end portions of the spring fingers so that movement of the pads relatively to the spring fingers was not possible while the pads gripped the work. Experience has shown that in practical use these pads of the feed chucks wore to a greater extent adjacent to the outer end portions thereof, and consequently, after these pads had been in use for a period of time, they did not properly grip the work because of improper seating of the pads on the surface of the work. In my earlier Patent No. 1,502,116 pads are shown which could adjust themselves relatively to the feed chuck to compensate for wear, but the difficulty with this construction was that the pads would frequently be dislodged when work pieces were inserted into the feed chuck.

One of the objects of this invention is to provide a mounting for the pads on the spring fingers in such a manner that the pads will be securely held on the feed chuck while work is positioned in the same and so that the pads may swing to a limited extent relatively to the feed fingers about fulcrums located approximately midway of the lengths of the pads, so that the pads may wear more evenly along their entire work-gripping surfaces, thereby greatly increasing the useful life of the pads.

A further object of this invention is to provide a construction in which the pads may swing about fulcrums intermediate of their ends so that as the pads wear, they will still grip the work firmly and substantially uniformly throughout their work-gripping surfaces.

A further object of this invention is to provide the pads with portions or bands on their outer surfaces located substantially midway between their ends, which engage the inner surfaces of the spring fingers while other portions of the pads have a clearance with the spring fingers, thus permitting the pads to swing about said bands, to properly engage the work.

Another object of this invention is to provide feed chucks in which the outer ends of the inner surfaces of the spring fingers are counterbored to a distance extending approximately from the outer ends thereof to approximately midway of the length of the pads, thus forming a shoulder about which the pads may swing to a limited extent.

Other objects and advantages will be apparent from the following description of one embodiment of the invention and the novel features will be particularly pointed out hereinafter in connection with the appended claims.

In the accompanying drawing:

Fig. 1 is a longitudinal, central, sectional elevation of a feed chuck or feed finger and work engaging pads embodying this invention.

Fig. 2 is an end elevation thereof.

Fig. 3 is a central, sectional elevation thereof, on an enlarged scale, the section being taken on line 3—3, Fig. 2.

Fig. 4 is a sectional view similar to Fig. 3 and showing a modified construction.

Fig. 5 is a side elevation, on a reduced scale, of a feed chuck or feed finger and showing means for spreading the outer ends of the spring fingers apart to remove the pads therefrom.

Fig. 6 is a face view of an implement employed for spreading the spring fingers.

In Figs. 1 and 2 is shown a feed chuck or feed finger of the type commonly used on automatic screw machines and the like, the inner end of the feed finger being provided with the usual threaded part 8 which may be screwed into a tubular member (not shown) by means of which the feed chuck is moved in the direction of its axis for advancing the work such, for example, as a bar or rod 9. The feed chuck is provided with two or more longitudinally extending slots 10 which extend throughout the greater part of the length of the feed chuck from the outer end thereof and which divide the outer portion of the feed chuck into spring fingers 11 and 12. Only two slots and two spring fingers are shown in the construction illustrated in the drawing, but it will be understood that this invention may be applied to feed chucks having more than two slots and spring fingers.

The outer ends of these spring fingers are provided with work-engaging pads 14 and 15 which may be held in correct, operative relation to the spring fingers in any suitable or desired manner. In the particular construction shown, each of the pads is provided at approximately its middle portion with an outwardly extending lug or extension 16 which is formed to enter into an opening 17 in a spring finger, so that the pads are held against rotation and endwise movement relatively to the spring fingers. In feed chucks as heretofore constructed in which the outer surfaces of the pads contacted over extended surfaces of the inner faces of the spring fingers, so that the pads during the gripping of the work could not move relatively to the spring fingers, it was found that excessive wear resulted on the outer end portions of the work engaging surfaces of the pads. This excessive wear is believed to be due to the face that the spring fingers, in their movement toward and from the axis of the feed swing about radii starting adjacent to the inner ends of the slots 10 approximately at the portions X in Fig. 1. Consequently, during the closing of the spring fingers and pads on the work, the outer ends of the spring fingers and of the pads move through a greater radius than the inner ends of the pads. In the feed chucks as originally supplied by the manufacturer, the parts were so constructed that the entire inner gripping faces of the pads would bear on the work for which the feed chuck was designed. However, after an initial wear on the gripping faces of the pads, the spring fingers would be required to move closer to the axis of the feed chuck and of the work in order to seat the pads thereon. This farther movement of the feed fingers toward the axis of the feed chuck would cause the outer ends of the pads, because of the longer radius of swing to press harder against the work than the inner ends of the pads which swing about a shorter radius. As the work gripping faces of the pads wear further, this action becomes more pronounced. Finally the outer end portions become so worn away that the pads no longer grip the work with sufficient force, whereupon the pads must be discarded before there has been any large amount of wear on the inner end portions thereof.

I have overcome this difficulty by constructing the feed chucks in such manner that the pads may rock about their connections with the spring fingers to a limited extent. In the construction shown for this purpose in Figs. 1 to 3, each pad is provided with an outwardly extending band fulcrum or portion of increased diameter 19 which extends circumferentially on the outer surface of this pad. This band is located approximately midway of the ends of the pad and is preferably so arranged that the projecting portions 16 extend outwardly from this band. The band may be produced on the pads by cutting down the portions of the pads extending forwardly and rearwardly from the band to a slight extent. As a result of this construction, the band only will normally engage the inner surface of the spring finger and clearances are provided at 20 and 21. Consequently, the pads may swing or pivot about the contacts between the bands and the spring fingers to the extent permitted by the clearances. The pads may be provided with the usual tapering, inner and outer end portions to facilitate inserting the work between the pads either from the inner or outer ends thereof. The spring fingers may also be provided with the usual shoulders 23 which prevent the work when inserted into the feed chuck from the inner end thereof from engaging the inner ends of the pads and thus damaging the pads or dislodging the same.

By means of the construction shown in Figs. 1 to 3, the tendency of the spring fingers to advance to the outer ends of the pads toward the axis of the feed chuck to a greater extent than the inner ends of the pads is counteracted by the fact that the pads may swing about the bands 19. Consequently, the pads will be free to swing relatively to the spring fingers so that they will exert equal pressure on the work throughout the lengths of the pads. This not only increases the life of the pads, since their gripping faces will wear uniformly throughout the lengths of the pads, but also enables the pads to grip the work more securely. By means of this construction as shown in Figs. 1 to 3, the work engaging pads may also swing about their bands 19 in the opposite direction, namely, in the direction permitted by the clearances 20, so that the inner ends of the pads may become separated to a greater extent. This is desirable for the reason that in most cases, work is inserted into the feed chuck from the left side in Figs. 1 to 3. Consequently, when the pads swing in this opposite direction, the inner or work receiving ends of the pads will open up to a greater extent, thus facilitating the insertion of the work into the feed chuck. After the work has entered between the pads, they will again swing about the bands to seat their work gripping faces on the work.

In Fig. 4, I have shown an alternative construction which may be used in cases where only standard work engaging pads without the bands 19 are available. In this construction, the inner surface of the feed chuck is counterbored as indicated at 25, this counterbore extending from the outer ends of the spring fingers to a point approximately midway of the lengths of the pads and midway of the outwardly extending lugs or projections 16 of the pads. In this construction, the portions of the pads extending inwardly from the lugs or projections will lie in contact with the inner surfaces of the feed fingers as was heretofore customary. The counterbored portion 25, however, forms a shoulder or fulcrum 27 about which the pads may swing, this shoulder taking the place of the bands 19 shown in Figs. 1 to 3. While this construction is particularly intended for use with pads as heretofore commonly made, it will be obvious that feed chucks with counterbored spring fingers may also be used with pads of the type shown in Figs. 1 to 3.

The operation of the construction shown in Fig. 4 is similar to that described in connection with Figs. 1 to 3, namely, as the inner gripping surfaces of the pads become worn so that the outer ends of the spring fingers will swing inwardly toward the axis of the feed chuck to a greater extent than the inner ends of the pads, the pads may swing about the annular shoulder 27 to the extent of the clearance 28 provided by the counterbore. The pads in the construction shown in Fig. 4, can swing only in one direction about the shoulder 27, whereas in the construction shown in Figs. 1 to 3, they may swing from their central or normal positions in either direction about the band 19. The construction shown in Fig. 4 has the further advantage that because of the counterbore in the end of the feed chuck, the extent to which the spring fingers must be separated in order to permit the pads to be removed from the feed chuck is decreased to the extent of the depth of counterbore. This is a desirable feature, since by spreading the spring fingers apart to a lesser extent, there is less danger of giving these fingers a permanent set, and thus reducing the force with which the spring fingers press the work engaging pads against the work.

In Figs. 5 and 6 is illustrated by way of example a construction for spreading apart the ends of the spring fingers for removal of the pads and for positioning the pads between the spring fingers. In the construction shown for this purpose, I have provided the outer ends of the slots 10 with enlargements 30, and I have also provided a tool or implement 31 preferably made of a flat strip of metal having a recess 32 formed in one end thereof and projections 33 extending toward each other into the recess 32. These projections 33 may be readily inserted into the opposite enlarged ends 30 of the slots 10 and by then swinging the implement, as shown in Fig. 5 until it extends substantially crosswise of the axis of the feed chuck, the spring fingers will be forced apart by a lever action, thus permitting the removal or replacing of work engaging pads into the feed chuck. The dimensions of these projections lengthwise of the implement are such that when the implement is swung to a position perpendicular to the axis of the feed chuck, the spring fingers will be spread apart just enough to permit the pads to be removed, without excessively bending the spring fingers so as to give them a permanent set.

The constructions described have been found to greatly increase the life of the pads. Furthermore, these constructions have the advantage that feed chucks constructed as described will more readily cooperate with work which is slightly larger or smaller than that for which the feed chuck is designed. In such cases, the pads can swing about their pivotal connections with the spring fingers, so that the work gripping faces of the pads will engage such off-size work throughout their lengths. The clearances 21 between the pads and the ends of the spring fingers have the further advantage that any burring or deformation of the metal of the feed fingers by the implement shown in Fig. 6, will not interfere with the proper seating of the pads on the ends of the spring fingers. The construction shown in Figs. 1 to 3 also has the advantage that if the spring fingers during heat treatment become deformed, for example, by being bowed inwardly intermediate of their lengths to a slight extent, the band 19 will enable the pads to adjust themselves to compensate for such deformation.

It will be understood that various changes in the details, materials, and arrangements of parts which have been herein described and illustrated in order to explain the nature of the invention, may be made by those skilled in the art within the principle and scope of the invention, as expressed in the appended claims.

I claim:

1. A feed chuck comprising a tubular member having spring fingers at the end thereof, said fingers having their ends separated from one another, pads supported within said tubular member by said spring fingers, means preventing dislocation of said pads from said fingers, and fulcrum means circumferentially located substantially midway the length of said pads so disposed as to provide a clearance between said pads and said fingers from said fulcrum means to the outer ends of said pads.

2. A feed chuck comprising a tubular member having spring fingers at the end thereof, said fingers having their ends separated from one another, pads supported within said tubular member by said spring fingers, means preventing dislocation of said pads from said fingers, and fulcrum means on said pads circumferentially located substantially midway the length of said pads so disposed as to provide clearance between said pads and said fingers from said fulcrum means to the outer ends of said pads.

3. A feed chuck comprising a tubular member having spring fingers at the end thereof, said fingers having their ends separated from one another, pads supported within said tubular member by said spring fingers, means preventing dislocation of said pads from said fingers, and fulcrum means on said spring fingers located substantially midway the length of said pads so disposed as to provide a clearance between said pads and said fingers from said fulcrum means to the outer ends of said pads, 4. A feed chuck comprising a tubular member having spring fingers at the end thereof, said fingers having their ends separated from one another, pads supported within said tubular member by said spring fingers, means preventing dislocation of said pads from said fingers and a band on said pads circumferentially located substantially midway the length of said pads so disposed as to provide a clearance between said pads and said fingers from said band to the outer ends of said pads.

5. A feed chuck comprising a tubular member having spring fingers at the end thereof, said fingers having their ends separated from one another, pads supported within said tubular member by said spring fingers, means preventing dislocation of said pads from said fingers, and a shoulder on said fingers circumferentially located substantially midway the length of said pads so disposed as to provide a clearance between said pads and said fingers from said shoulders to the outer ends of said pads.

References Cited in the file of this patent

UNITED STATES PATENTS

| Number | Name | Date |
|---|---|---|
| 1,646,925 | Minard | Oct. 25, 1927 |
| 1,725,492 | Tessky | Aug. 20, 1929 |
| 1,937,236 | Laughlin | Nov. 28, 1933 |
| 2,069,775 | Rich | Feb. 9, 1937 |
| 2,187,170 | O'Connell | Jan. 16, 1940 |
| 2,232,534 | Jarman | Feb. 18, 1941 |
| 2,479,076 | Martin | Aug. 16, 1949 |
| 2,521,099 | Sheffer | Sept. 5, 1950 |
| 2,530,568 | Daddona | Nov. 21, 1950 |